United States Patent

Bouchard et al.

[15] 3,696,408

[45] Oct. 3, 1972

[54] KEYBOARD ENCODER

[72] Inventors: Richard J. Bouchard, Amherst; Richard C. Belden, Litchfield, both of N.H.

[73] Assignee: Sanders Associates, Inc., Nashua, N.H.

[22] Filed: Nov. 23, 1970

[21] Appl. No.: 91,692

[52] U.S. Cl. ................340/365, 178/17 C, 179/90 K, 200/166 C, 197/98

[51] Int. Cl. ..............................................G08c 1/00

[58] Field of Search ...........340/365; 178/17 R, 17 C; 179/90 K; 200/5 R, 5 E, 166 R, 166 C, 166 CM, 166 PC; 338/99, 114; 197/98

[56] References Cited

UNITED STATES PATENTS

| | | | |
|---|---|---|---|
| 3,503,031 | 3/1970 | Nyhus et al. | 338/99 |
| 3,592,979 | 7/1971 | Redman | 200/86 R |
| 3,120,583 | 2/1964 | Cornell | 200/5 E |
| 3,506,795 | 4/1970 | Schmidt | 200/5 R |
| 2,931,877 | 4/1960 | Henley | 338/114 |
| 3,509,296 | 4/1970 | Harshman et al. | 340/365 X |
| 2,445,660 | 7/1948 | Bruestle | 338/114 |

*Primary Examiner*—John W. Caldwell
*Assistant Examiner*—Robert J. Mooney
*Attorney*—Louis Etlinger

[57] ABSTRACT

Keyboard encoding apparatus having a plurality of keys with different codes of an N digit binary code assigned to each key. A plurality of groups of contact pads are secured to a sheet of electrically non-conductive material at different key locations which are in registration with the keys. Each group of pads includes at least one power pad and a number of digit pads equal to the number of binary 1's in the associated code. A power lead is secured to the sheet and has connections to all of the power pads. N digit leads are also secured to the sheet with different digit leads being indicative of different orders of the code. Each of the digit leads has connections to those digit pads which are indicative of a like order of the code. A keying means includes a layer of spongy conductive material at each key location disposed in a normal position a distance away from the contact pads and responsive to the actuation of any one of the keys to provide a common connection of the digit pads and the power pad at the associated key location.

7 Claims, 3 Drawing Figures

INVENTORS
RICHARD J. BOUCHARD
RICHARD C. BELDEN
By Robert R. Hubbard
ATTORNEY

KEYBOARD ENCODER

BACKGROUND OF THE INVENTION

1. Field of the Invention

The present invention relates to novel and improved data entry devices and in particular to novel keyboard encoder apparatus. Keyboards are useful, for example, for entering and/or editing data into or in a data processing system. Typically, each key represents a symbol. A different coded combination of an N digit code is assigned to each different symbol or key. When a selected key is depressed, the coded combination associated with the selected key is manifested as N digit signals on N digit output leads.

2. Description of the prior art

In one type of prior art keyboard apparatus, each key may be considered as a single switch such that there are m output leads for m switches or keys. A separate encoder unit is then employed to convert a one out of m input to an N digit code indicative of the selected one of the m keys. The cost of the encoding unit has heretofore been relatively expensive. In addition, the m connections between the keys and the encoder unit have resulted in limited reliability due to the human factor involved in the manufacture of the connections.

In another type of keyboard unit, the encoding is integral with the keys. That is, there is associated with each key a number of sensors equal to the number of binary 1's in the associated coded combination. When a selected key is depressed or actuated, the sensors associated therewith produce signals which are coupled to appropriately ordered ones of N digit leads so as to provide an electrical signal manifestation of the coded combination assigned to the selected key. In the past, the sensors have taken the form of magnetic and/or electrical field sensing elements which sense a change in field conditions caused by the actuation of an associated key. Keyboard apparatus employing field sensing elements have heretofore been relatively expensive to manufacture. The sensors have also taken the form of electrical terminals or contact pads which are electrically isolated when the associated key is in a normal position and which are commonly coupled together to a power terminal when the key is depressed. One of the problems with this type of arrangement has been that the common connection made when a key is depressed has been unreliable.

BRIEF SUMMARY OF THE INVENTION

An object of the present invention is to provide novel and improved keyboard encoding apparatus.

Another object is to provide a low cost keyboard entry device with integral encoding.

Still another object is to provide a novel keyboard encoder employing an electrical terminal sensor arrangement with a reliable contact being made when a key is depressed.

Briefly, the invention is embodied in a keyboard which has a plurality of keys with different coded combinations of an N digit binary code assigned to each key. A plurality of groups of contact pads are secured to a sheet of electrically non-conductive material such that different groups are arranged at different key locations on the sheet. Each group of contact pads includes a power pad and a number of digit pads equal to the number of digits of one binary value in the associated code. A power lead also secured to the sheet has connections to all of the power pads. N digit leads are also secured to the sheet with different digit leads being indicative of different orders in the N digit code. There are connections between the digit pads of each group and appropriately ordered ones of the N digit groupings. A keying means includes a layer of spongy, conductive material at each key location disposed in a normal position a distance away from the contact pads. The spongy layer is responsive to the actuation of any one of the keys to provide a common connection of the digit pads and the power pad at the associated key location so as to provide on the N digit leads an electric signal manifestation of the coded combination assigned to the selected key without contact bounce.

BRIEF DESCRIPTION OF THE DRAWING

In the accompanying drawing like reference characters denote like components, and.

DESCRIPTION OF PREFERRED EMBODIMENT

Figures 1, 2, 3:
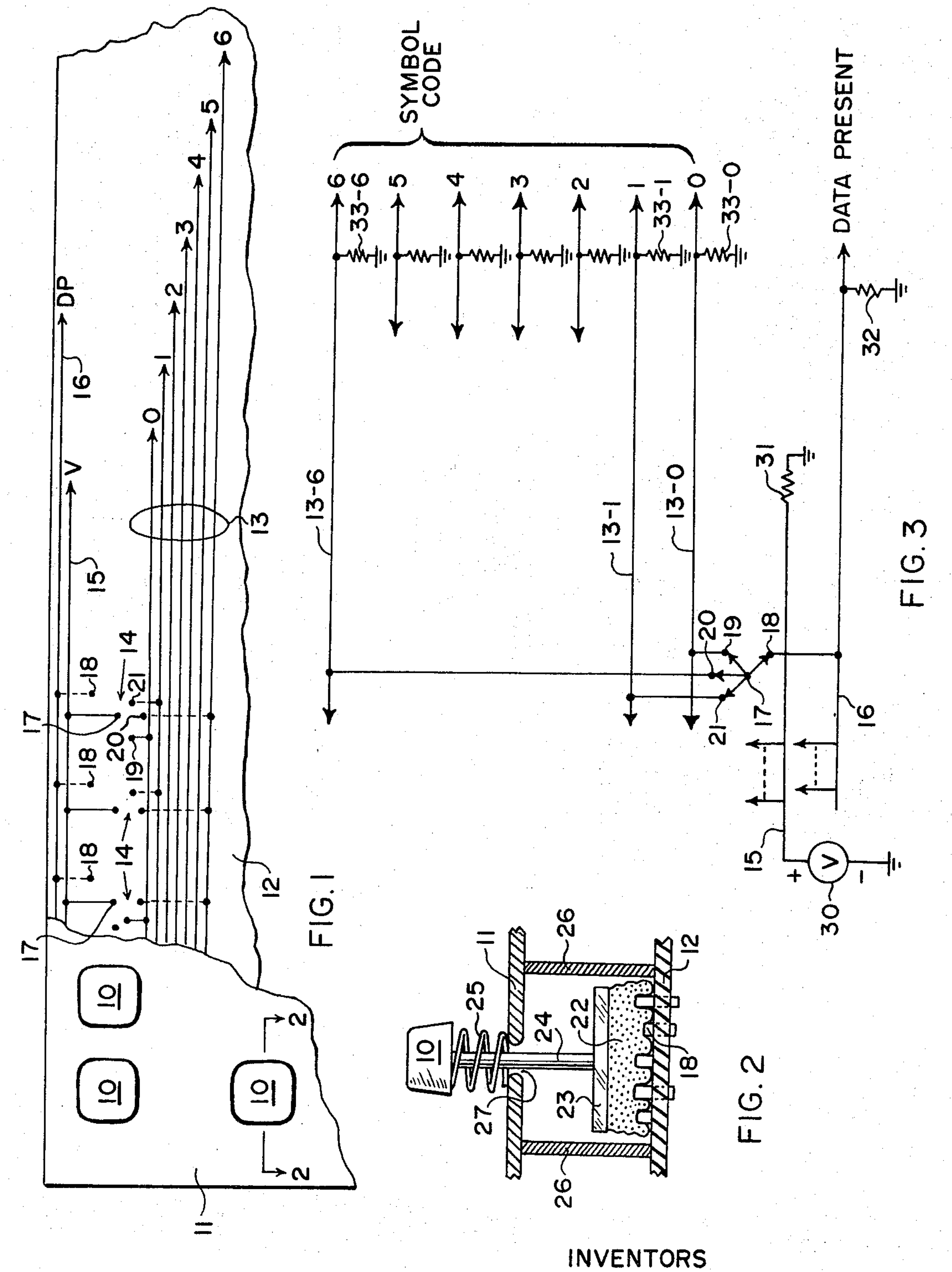
FIG. 1 is a plan view of a portion of a keyboard apparatus embodying the invention and having a cutaway portion to illustrate an exemplary contact pad and digit lead arrangement.
FIG. 2 is an enlarged sectional view taken along the lines 2—2 of FIG. 1.
FIG. 3 is an electrical schematic drawing illustrating the connections from a selected or actuated key to N digit leads.

Referring now to FIG. 1 keyboard encoder apparatus embodying the invention is shown to include a sheet of non-conductive material 12 upon which N digit leads 13 are arranged. For the illustrated embodiment N=7. Individual ones of the N digit leads are designated on the drawing by the orders 0 through 6, corresponding to the orders of an N digit binary code. In the description which follows, the reference character 13 will be used to refer to the digit leads collectively while reference to specific ones of the digit leads will be made by hyphenating the appropriate order to reference character 13. Thus, for example, the uppermost digit lead in FIG. 1 will be identified as 13–0. The second digit lead from the top will be identified as 13–1, and so on.

The digit leads 13 are arranged on the sheet 12 so as to be adjacent each of several key locations 14. As shown, the digit leads 13 may run in a straight line fashion on one side of a row of key locations 14. For the sake of simplicity only a few of the key locations 14 are shown. For example, one popular design includes a set of 64 symbols associated with four rows of keys. For this case the number of key locations 14 would be at least 64 which would be arranged in four rows. A power lead 15 and a strobe or data present (DP) lead 16 are arranged on the sheet 12 to run along the row of key locations 14 but on the opposite of the row from the digit keys 13.

At each of the key locations 14 there is provided on sheet 12 a power contact pad 17 and a data present pad 18. Each of the key locations 14 is assigned a symbol (e.g. an alphanumeric character) and a coded combination of the N digit code. To this end, there is provided at each key location 14 on sheet 12 a number of digit pads equal to the number of digits of one of the two binary values. For the purpose of the present description, it will be assumed that the number of digit contact pads at a key location is equal to the number of binary 1's in the coded combination assigned to that key location. Thus, at the rightmost key location 14 illustrated in FIG. 1 there are three digit contact pads 19, 20 and 21, signifying that there are three binary 1's in the coded combination which represents this key location. Others of the key locations may have more or less of the digit pads. For example, the middle one of the three illustrated key locations 14 has only two digit contact pads.

The digit contact pads at each of the key locations 14 are connected to appropriately ordered ones of the digit leads 13. Thus, the digit contact pads 19, 20 and 21 are shown to be connected to the digit lead 13–0, 13–6 and 13–1, respectively, whereby the code combination assigned to this key location is 1100001. The power contact pad 17 and the data present pads 18 are shown to be connected to the power lead 15 and the DP lead 16, respectively.

The non-conductive sheet 12 may suitably take the form of a printed circuit board whereby the digit leads 13, the power lead 15, the DP lead 16 and the various contact pads and connectors are printed circuit conductors arranged on the surface of the printed circuit board. In order to solve cross over problems, both sides of the board or sheet may be employed. Thus, the leads connecting digit contact pads 20 and 21 to digit leads 13–6 and 13–1 have been shown as dashed connectors which are disposed on the bottom side of sheet 12. Accordingly, the contact pads 20 and 21 must include a suitable connector extending through sheet 12 so as to contact the connectors on the bottom side thereof. The connectors between the DP line 16 and the data present contact pads 18 are also shown as dashed lines to indicate that they are also on the bottom side of sheet 12. A plurality of keys 10 are arranged in spaced apart relation to and in registration with corresponding ones of the key locations 14. As best seen in the cross-sectional view of FIG. 2, each key 10 includes a layer 22 of the electrically conductive spongy material which when the key is actuated or depressed envelopes all of the contact pads at the key location so as to commonly connect them all together. The effect of this, of course, is to couple operating power or voltage from the power lead 15 to correspondingly ordered ones of the N digit leads 12 as well as to the DP lead 16. As shown in FIG. 2, the DP contact pad 18 is preferably somewhat lower in height than the digit contact pads and power pad so that connections are made between the power pad and digit pads before contact is made between the power pad and the DP pad. This arrangement assures that the binary signal manifestation is present on the digit leads 13 before the data present signal is produced. Due to the resiliency of the layer 22, the contact is relatively bounce free.

The layer 22 of electrically conductive spongy material may suitably be an electrically conductive polyurethene foam. For the illustrated embodiment, there is a separate spongy layer 22 for each of the keys 10. However, this need not be the case. For example, the layer 22 may be a single continuous layer which is normally held in a spaced apart relation to printed circuit 12. For example, the keys 10 may all be secured on a sheet of non-conductive flexible material which is adhered to one surface of a layer of spongy, electrically conductive material. The key and spongy material sandwich would then be held in a spaced apart relation to the printed circuit board 12 such that the keys 10 are in registration with corresponding ones of the key locations 14. A suitable spacer element could be an apertured sheet of sponge rubber such as the one described in the co-pending application of Herbert E. Schmitz and Robert A. Bleau for Monolithic Keyboard and Method for Making Same, Ser. No. 879,479, filed Nov. 24, 1969, now U.S. Pat. No. 3,627,927, issued Dec. 14, 1971.

With reference again to FIG. 2, the electrically conductive spongy layer 22 is shown to be adhered to one surface of a face plate 23. The face plate 23 is attached to the shaft 24 of the key element 10. A spring 25 and a keyholder 11 are provided to normally hold the key 10 and its associated spongy layer 22 a suitable distance away from the contact pads of the associated key location on sheet 12. The key holder 11 is spaced from the sheet 12 by any suitable spacer means, such as the spacer elements 26 shown in FIG. 2. The keyholder 12 includes an aperture 27 for each of the keys 10 through which extends the key shaft 24. The spring 25 normally biases the key 10 into the aforementioned spaced apart position. In FIG. 2, though, the spring 25 is shown in a compressed state in order to show the depressed or actuated position where the electrically conducted spongy layer 22 provides a common connective medium for the contact pad at the corresponding key location. A suitable housing structure (not shown) may be provided to enclose the printed circuit 412 and the keyholder 11.

The electrical circuit diagram of FIG. 3 shows the circuit condition which prevails when a selected key is activated (namely the key associated with the rightmost illustrated key location 14 of FIG. 1). In FIG. 3 a source 30 of operating voltage is shown to have its positive terminal connected to the power line 15 and its negative terminal connected to a suitable point of reference potential, such as circuit ground. One return path for the power conductor 15 is by way of a resistor 31.

The power and data present contact pads 17 and 18 are shown to be connected to the power and DP leads 15 and 16, respectively. Digit contact pads 19, 20 and 21 are shown to be connected to the digit leads 13–0, 13–6 and 13–1 respectively, for the actuated condition of the corresponding key element. Also shown as associated with each of the digit leads 13 are separate resistors for providing a return path to ground. Thus, resistors 33–0, 33–1, 33–6 are shown for the digit leads 13–0, 13–1 and 13–6, respectively. These resistors may represent the input impedances of the circuits to which the associated digit leads are connected. Thus, when power contact pad 18 is shorted by the spongy material 22 to the digit contact pads 19, 20, and 21 current flows (in the conventional sense) from the positive terminal of source 30 through the power line 15, the contact pads 19, 20, and 21, the digit leads 13–0, 13–1 and 13–6 and by way of the resistors 33–0, 33–1, and 33–6 to ground. Accordingly, voltages are developed across the resistors 33–0, 33–1 and 33–6. On the other hand, there is no current applied to the remaining digit lines such that these lines are substantially at ground potential.

The data present circuit serves to provide a data present signal whenever anyone of the keys 10 is actuated. For the FIG. 3 illustration, current from the power line 15 is coupled by way of the power contact pad 17 and the data present contact pad 18 to the data present lead 16. A resistor 32 is shown as connected between the DP lead 16 and circuit ground. This resistor is shown so as to represent the input impedance of the circuit to which the DP lead 16 is connected and, hence, represents the return path to ground. Due to the lesser elevation of the DP contact pad 18, the DP signal is produced a short time later than the digit currents in the digit leads 13.

There has been described keyboard apparatus embodying the invention in which a layer of electrically conductive spongy material is employed at each key location to provide a connection between a power source and appropriately ordered ones of N digit leads in response to the actuation of a selected key. Voltages are developed across the appropriately ordered ones of the N digit leads while the remaining digit leads are substantially at circuit ground. The voltage conditions of the N digit lead are then a manifestation of the coded combination of an N digit code which is assigned to a selected key.

The illustrated arrangement of the digit leads, contact pads, power pad and data present pad are exemplary of one embodiment of the invention. In other embodiments, the arrangement may be altered. For example, at each key location, there may be up to as many power and data present pads as there are digit pads. Thus there may be a power and a DP pad provided for each digit pad. Of course, all power and DP pads will have to be connected to the power and data present leads.

What is claimed is:

1. In keyboard apparatus having a plurality of keys with different codes of an N digit binary code assigned to each key, said apparatus comprising
   - a sheet of electrically nonconductive material having a plurality of key locations;
   - a plurality of groups of contact pads with different groups being secured to said sheet at different key locations, each group including a power pad and a number of digit pads equal to the number of digits of one binary value in the associated code;
   - N digit leads secured to said sheet with different digit leads being indicative of different orders in said N digit code, each digit lead having connections to those digit pads which are indicative of a like order of said one binary value;
   - a power lead secured to said sheet and having connections to all said power pads; and
   - keying means including
     - a layer of spongy conductive material at each key location disposed in a normal position a distance away from the associated contact pad groups so as to form gaps therebetween, and
   - said plurality of keys being arranged on the free side of the spongy layer in alignment with said key locations, each key being operative when actuated to move the spongy layer from its normal position in a direction to close the associated gap such that the spongy material envelopes the digit pads and the power pad at the associated key locations so as to provide a common connection thereof.

2. Keyboard apparatus as defined in claim 1
   wherein said layer is comprised of separate spongy layers disposed at each key location.

3. Keyboard apparatus as set forth in claim 2
   wherein each group of contact pads further includes a data present pad; and
   wherein a data present lead is secured to said sheet and has connections to all of said data present pads.

4. Keyboard apparatus as set forth in claim 3
   wherein the elevations of the power and digit pads from said sheet are greater than the elevation of said data present pad so that contact is made between the power and digit pads by said spongy layer before contact is made to the data present pad when any one of said keys is actuated.

5. A keyboard comprising
   - a sheet of electrically nonconductive material having a plurality of key locations;
   - a plurality of contact pads with different ones of the pads being secured to said sheet at different key locations; and
   - keying means including
     - a layer of spongy conductive material at each key location disposed in a normal position a distance away from said contact pads so as to form gaps therebetween, and
     - a plurality of keys arranged on the free side of the spongy layer in alignment with said key locations, each key being operative when actuated to move the spongy layer from said normal position in a direction to close the associated gap such that the spongy material envelops the associated contact pad.

6. The invention as set forth in claim 5
   wherein there are at least two contact pads secured to said sheet at each key location; and
   wherein the spongy material envelopes both contact pads at a key location associated with an actuated key so as to form a common electrical connection therebetween.

7. A keyboard as defined in claim 6
   wherein said layer is comprised of separate spongy layers disposed at each key location.

* * * * *